July 1, 1941.  G. C. PAPENDICK  2,247,698
MEANS FOR FRACTIONATING SLICED BAKED BREAD LOAVES
Filed April 24, 1939  3 Sheets-Sheet 2

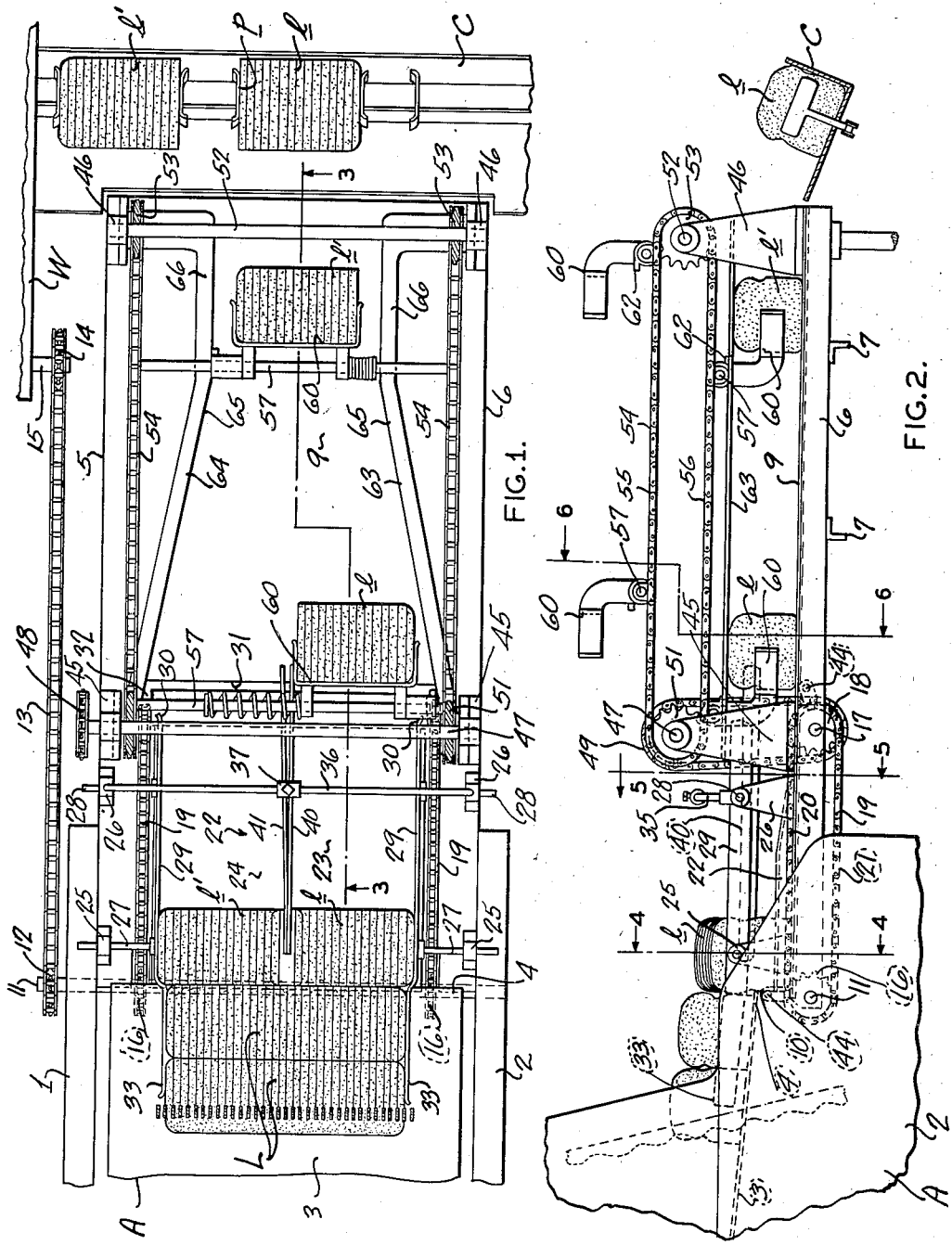

INVENTOR
GUSTAV C. PAPENDICK
BY
ATTORNEY

July 1, 1941.   G. C. PAPENDICK   2,247,698
MEANS FOR FRACTIONATING SLICED BAKED BREAD LOAVES
Filed April 24, 1939    3 Sheets-Sheet 3

INVENTOR
GUSTAV C. PAPENDICK
ATTORNEY

Patented July 1, 1941

2,247,698

UNITED STATES PATENT OFFICE 2,247,698

MEANS FOR FRACTIONATING SLICED BAKED BREAD LOAVES

Gustav C. Papendick, University City, Mo.; Elizabeth Papendick, executrix of Gustav C. Papendick, deceased, assignor to Papendick, Inc., St. Louis, Mo., a corporation of Missouri Application April 24, 1939, Serial No. 269,808

11 Claims. (Cl. 146—153)

This invention relates to a certain new and useful improvement in conveying means for handling fractionating sliced baked bread loaves.

The present invention is related to the subjects-matter of my co-pending patent applications Serial Nos. 242,430, 242,431, 242,432, 242,433, and 242,434, all filed November 25, 1938, and has for its primary objects the provision of conveyer means for handling fractionated sliced broad loaves which is exceptionally speedy, efficient, and economical, but also of means which will automatically pick-up the loaf fractions and shift them out of axial alignment for movement in a consecutive series which will convey or handle the loaf-fractions at high speed in timed relation to the other bread production processes, which will hold the pieces of the fraction together in compact relationship during transfer movement and which is otherwise highly efficient in the performance of its stated functions.

And with the above and other objects in view, my invention resides in the unique method steps and in the novel features of form, construction, arrangement, and combination of parts presently described and pointed out in the claims.

In the accompanying drawings (3 sheets):

Figure 1 is a plan view of a bread loaf fractionating mechanism constructed in accordance with and embodying my present invention;

Figure 2 is a side elevational view of such mechanism;

Figure 4:
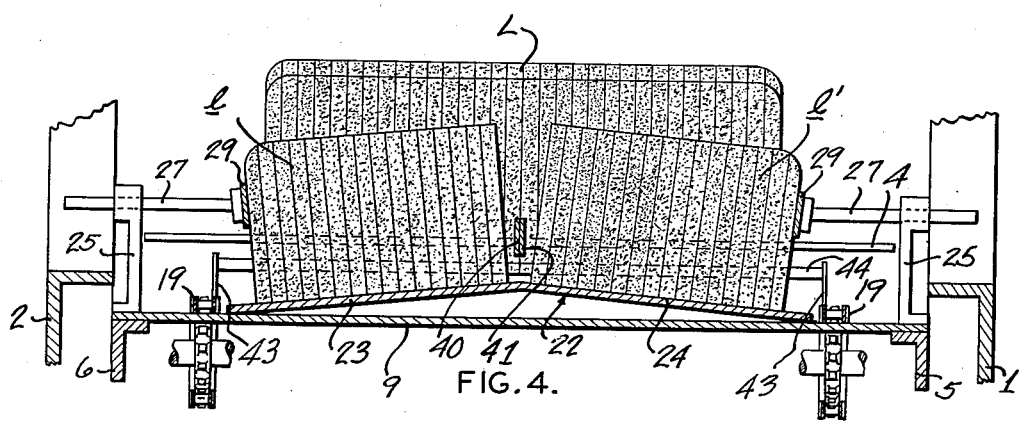
Figure 5:
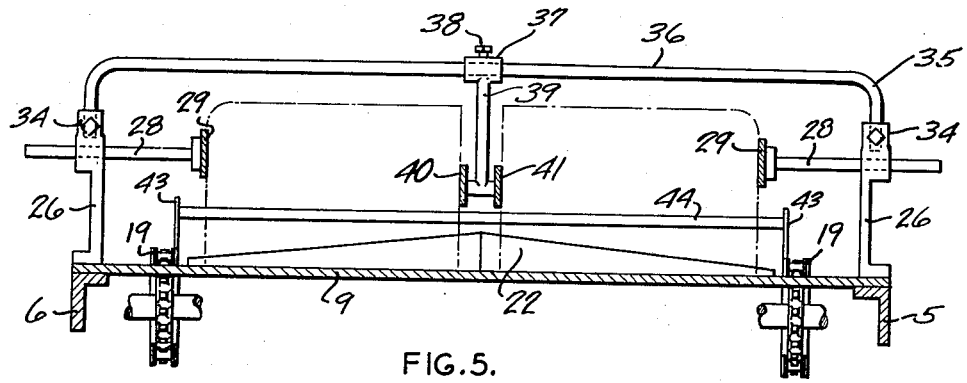
Figure 6:
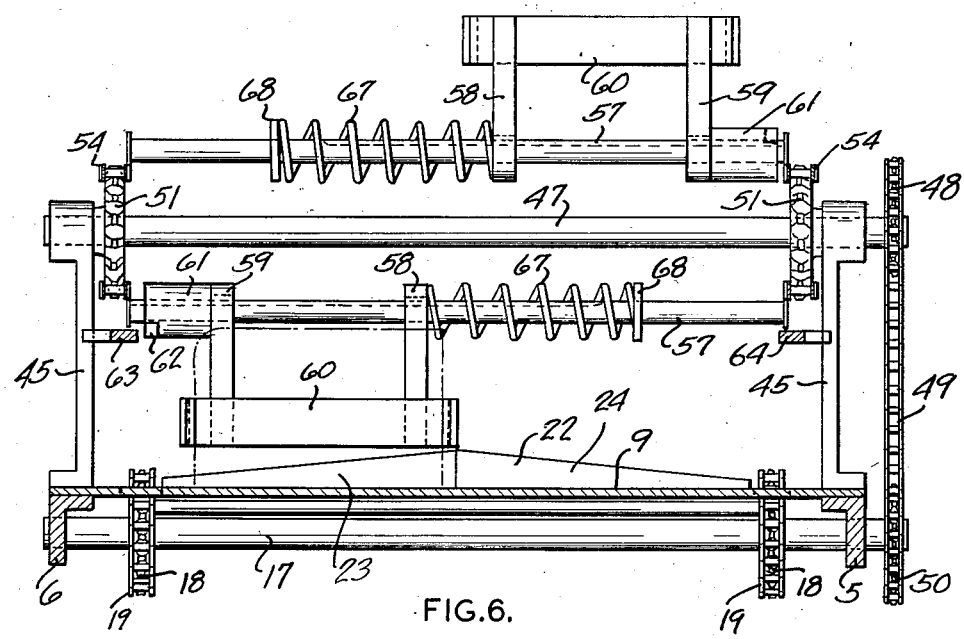
Figure 7:
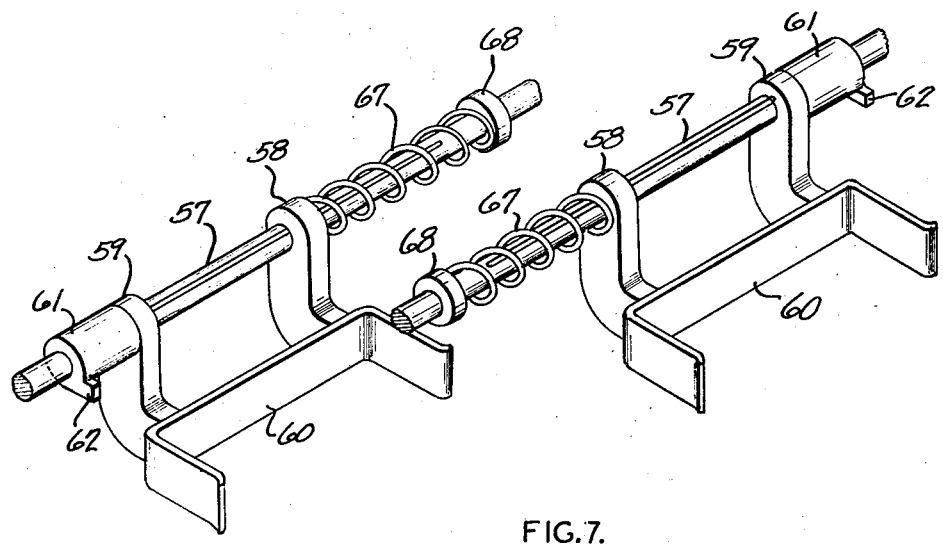

Figures 4, 5, and 6 are transverse sectional views of such mechanism, taken approximately along the lines 4—4, 5—5, and 6—6, respectively, Figure 2; and Figure 7 is an enlarged perspective view of the loaf fraction gripping members forming part of such mechanism.

Referring now in more detail and by reference characters to the drawings, which illustrate a preferred embodiment of my present invention, A designates a bread loaf slicing machine preferably of reciprocating knife-blade type, which includes a pair of opposed side frames 1, 2, and a conventional grid plate 3, the latter extending transversely between the side frames 1, 2, at the discharge end of the machine and having a preferably integral forwardly projecting delivery lip 4, all as best seen in Figure 1 and for purposes presently appearing.

Mounted rigidly on, and extending forwardly from, the side frames 1, 2, is a pair of opposed parallel side panels 5, 6, transversely connected and braced by a plurality of parallel angle iron members 7 and supported at their respective forward ends by legs.

Supported by and extending horizontally between, the side panels 5, 6, is a conveyer table 9 projecting at its rear end beneath, and being spaced downwardly from, the forward margin of the delivery lip 4 in the provision of a clearance gap 10, all as best seen in Figure 2 and for purposes presently fully appearing.

Journaled at its one end in the side panel 6 and at its other end journaled in and projecting through both the side panel 5 and the side frame 1, and extending beneath the rearward extremity of the table 9, is a transverse drive-shaft 11 provided upon its projecting end with a driving sprocket 12 connected by means of a conventional sprocket chain 13 with a sprocket 14 pinned or otherwise fixed upon the projecting end of a main drive shaft 15 of a conventional wrapping machine W. Intermediate its journaled ends and preferably adjacent the respective inwardly presented faces of the panels 5, 6, the shaft 11 is provided with sprockets 16, all as best seen in Figures 1 and 2 and for purposes presently fully appearing.

Similarly journaled at its ends in the side panels 5, 6, and extending transversely beneath the conveyer table 9 and spaced forwardly from the shaft 11 by a distance approximately equal to one-third the length of the conveyer table 9, is an idle shaft 17 provided with a pair of sprockets 18 respectively positioned in parallel alignment with the sprockets 16. Reeved upon the aligned pairs of sprockets 16, 18, is a pair of endless conveyer chains 19, each having an upper forwardly traveling run 20 extending over the upper face of the conveyer table 9 and a lower return run 21 extending rearwardly beneath the conveyer table 9, all as best seen in Figure 2 and for purposes presently more fully appearing.

Welded or otherwise fixed upon the upper face, and at or adjacent the rear end, of the conveyer table 9, is a divider plate 22 transversely bent about its longitudinal center line in the provision of two obliquely inclined plane-surfaced slides 23, 24. The plate 22 at its rear end projects beneath the margin of the delivery lip 4, and at its forward end is curved or tapered downwardly across its entire width into a horizontal plane substantially contiguous to the upper face of the conveyer table 9.

Mounted on the side panels 5 and 6, are opposed pairs of axially bored guide brackets 25, 26, for shiftably supporting pairs of aligned guide rods 27, 28. Welded or otherwise fixed on the inner ends of, and extending between, the guide rods 27, 28, are opposed track-defining side guides 29 extending in substantial parallelism with the longitudinal axis of the conveyer table 9. At their forward end, the guides 29 terminate at points substantially above the idle shaft 17 and are curled sharply outwardly in the provision of opposed end lips 30 to prevent accidental damaging of the bread loaves.

Forwardly of the end lips 30 and the idle shaft 17, the conveyer table 9 is provided with a transverse clearance slot 31, and formed in the table 9 and communicating with the slot 31 at its outer ends, are rearwardly extending auxiliary slots 32 for accommodating the chain-supporting sprockets 18 peripherally around which the conveyer chains 19 pass downwardly and rearwardly beneath the table 9. At their rear end, the guides 29 are each further provided with an integral inwardly offset straight section 33, which lies in a plane substantially perpendicular to the plane of the discharge lip 4. The guides 29 are furthermore bent into a plane substantially perpendicular to the subjacent surfaces of the divider plate 22, all as best seen in Figure 1 and for purposes presently more fully appearing.

Each of the guide brackets 25 is provided with a preferably integral upwardly extending socket 34 for supporting the ends of an inverted U-shaped bridge member 35 having a horizontally disposed bight 36, shiftably mounted on which is a hanger-collar 37 provided with a set-screw 38 for securing the collar 37 in any adjusted position along the bight 36.

Formed preferably integrally with, and depending from, the collar 37, is a bar 39 provided at its lower extremity with a pair of opposed parallel intermediate divider guides 40, 41, disposed over and along the ridge-like center line of the divider plate 22.

Figure 3:
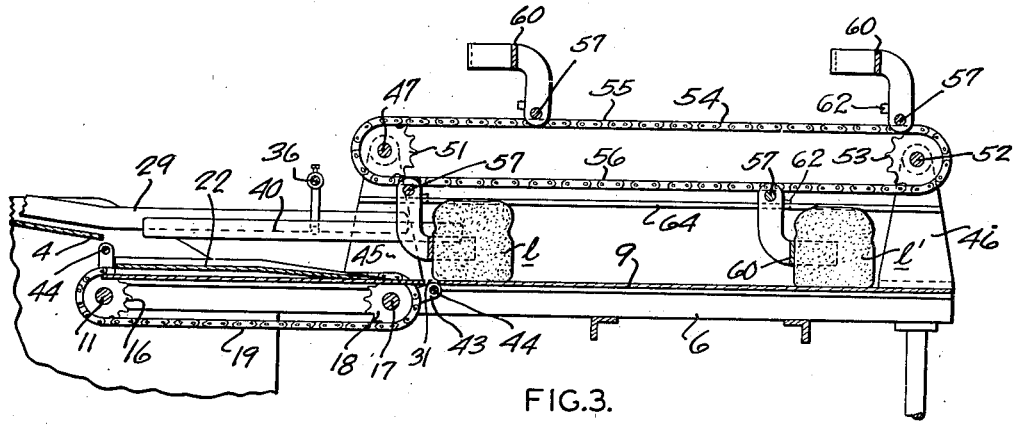
Figure 3 is a longitudinal sectional view of such mechanism, taken approximately along the line 3—3, Figure 1.

Mounted at their ends in, and extending transversely between, projecting lugs 43 on the chains 19, is a plurality of parallel flight rods 44 spaced upwardly from the face of the conveyer table 9 by a distance sufficient to pass freely over and clear the divider plate 22, as best seen in Figures 2 and 3 and for purposes presently more fully appearing.

Mounted on the side panels 5, 6, slightly forwardly of the guide brackets 26, is a pair of transversely aligned upstanding shaft brackets 45, and similarly mounted on the panels 5, 6 adjacent their forward end, is a second pair of transversely aligned shaft brackets 46.

Journaled at its opposite ends in, and extending through, the brackets 45, is a drive shaft 47 provided on an extended end with a drive sprocket 48, in turn, connected by means of a drive chain 49 with a drive sprocket 50 pinned or otherwise fixed on the extended end of the idle shaft 17. Also pinned on the shaft 47 inwardly of and adjacent the brackets 45, is a pair of sprockets 51.

Similarly journaled at its ends in, and extending horizontally between the forward pair of brackets 46, is an idle shaft 52 provided with a pair of sprockets 53, respectively, mounted in peripheral alignment with the sprockets 51. Reeved over, and around the peripherally aligned pairs of sprockets 51, 53, is a pair of parallel continuous conveyer chains 54 having upper and lower horizontal runs 55, 56, the latter being positioned in a plane substantially above the top of the traveling bread loaves which must pass therebeneath, as best seen in Figure 2 and for purposes presently more fully appearing.

Mounted on, and extending transversely between, the conveyer chains 54, is a plurality of conveyer rods 57, and shiftably mounted upon each of the rods 57 by means of a pair of spaced angle-brackets 58, 59, is a substantial U-shaped conveyer pocket 60 sized for snugly accommodating a single loaf fraction. As best seen in Figure 7, each lug 59 is provided with a laterally presented cylindrical enlargement 61 having finger-projection 62 for sliding engagement with one or the other of a pair of opposed cam tracks 63, 64, mounted respectively on and extending longitudinally between the pairs of shaft brackets 45, 46, and each including a forward oblique section 65 extending forwardly and inwardly in a horizontal plane above the conveyer table 9 and a forward straight section 66, which is substantially parallel to the longitudinal axis of the conveyer table 9.

Coiled on each of the rods 57, is a compression spring 67 impinging at one end against the bracket 58 and abutting at its other end against a collar 68 suitably located and fixed upon the rod 57. As has been above pointed out, the respective loaf-gripping members or pockets 60 are arranged in alternate right and left hand sequence upon the successive conveyer rods 57, so that one member 60 will grip one fraction and the next succeeding member 60 will grip the other fraction of each particular subdivided or fractionated loaf as they are progressed across the conveyer table 9.

Hence, in use and operation, the sliced baked bread loaves L, on discharging from the forward end of the discharge lip 4, drop upon the divider plate 22 and are each automatically split or divided into two fractions l, l', as shown in Figure 4. As each loaf L comes to rest in subdivided or fractionated position upon the divider plate 22, a flight rod 44 of the chains 19 moves upwardly from beneath the conveyer table 9 through the clearance gap 10 and propels or progresses both fractions l, l', forwardly across the divider plate 22 to a position in axially spaced relation upon the conveyer table 9 approximately beneath the shaft 47, the chains 19 passing downwardly through the slot 31 and returning beneath the table 9. As the loaf fractions l, l', come to rest, one of the loaf gripping members or pockets 60 moves around and downwardly, gripping the particular loaf fraction in its path and progressing the same forwardly across the table 9. As such loaf engaging and propelling member 60 moves forwardly, the finger-projection 62 of the bracket-enlargement 61 comes into engagement with the oblique section 65 of either the cam track 63 or 64, as the case may be, depending upon whether the initially gripped loaf fraction l' is on the right-hand or left-hand side of the machine, a matter which is entirely optional with the operator. In any case, the particular conveyer-pocket or fraction gripping member 60 is shifted laterally along the conveyer rod 57 against the tension of the compression spring 67, delivering the gripped loaf fraction directly into one of the conventional pockets p of an intermittently moving wrapping machine conveyer C. Subsequently, a successive pocket 60 grips the other loaf fraction l' and progresses the same forwardly toward the center of the table 9 for ultimate delivery to a succeeding pocket p of the wrapping machine conveyer C.

It will thus be evident that, by my present invention, I provide a unique means of subdividing or fractionating a sliced baked bread loaf which is simple in construction and also readily applied to or installed upon various types of existing bread slicing and conveying machinery without necessitating any material or extensive reconstructions, modifications, or adaptations of such machinery. In addition, it has been found that the present structure will subdivide sliced bread loaves without damaging any of the loaf slices and requires no critical adjustment with reference to the particular slice cut at which the loaf is to be subdivided.

The mechanism described fulfills in every respect the objects stated, and it will be understood that changes and modifications in the form, construction, arrangement, and combination or the several parts of the machine may be made and substituted for those herein shown and described without departing from the nature and principle of my invention.

Having thus described my invention, what I claim and desire to secure by Letters Patent is:

1. Bread loaf fractionating mechanism including means for slicing the loaf, a table, means for initially progressing the sliced loaf over the table to a position of momentary rest intermediate the table ends, means for dividing the sliced loaf into fractions during such initial progressive movement, and means comprising members for alternately gripping first one and then the other of said loaf fractions and then progressing the same in aligning succession from the position of rest to the end of the table.

2. Bread loaf fractionating mechanism including means for slicing the loaf, a table, means for progressing the sliced loaf over the table, means for dividing the sliced progressed loaf into fractions, and means comprising a plurality of yieldingly shiftable members successively traveling over the table for alternately gripping first one and then the other of said fractions and progressing the same in aligning succession over the table.

3. Bread loaf fractionating mechanism including means for slicing the loaf, a table, means for progressing the sliced loaf over the table, means for dividing the sliced progressed loaf into fractions, said means comprising a pair of spaced endless chains mounted for movement over the table, spaced parallel rods extending between and fixed to said chains, and fraction-gripping members yieldingly shiftable on said rods.

4. Bread loaf fractionating mechanism including means for slicing the loaf, a table, means for progressing the sliced loaf over the table, means for dividing the sliced progressed loaf into fractions, said means comprising a pair of spaced endless chains mounted for travel longitudinally of and over the table, spaced transverse rods extending between and fixed to said chains, fraction-gripping members yieldingly shiftable on said rods, and cams on the table engageable with said gripping members for shifting the same relatively to the table.

5. Bread loaf fractionating mechanism including means for slicing the loaf, a table, means for progressing the sliced loaf over the table, means for dividing the sliced progressed loaf into fractions, said means comprising a pair of spaced endless chains mounted for travel longitudinally of and over the table, spaced transverse rods extending between and fixed to said chains, fraction-gripping members shiftable on said rods, springs on the rods for normally urging said gripping members outwardly toward said chains, and fixed cam members on the table engageable with the gripping members for yieldingly shifting the same inwardly from the chains during fraction progressing travel of the chains.

6. Bread loaf fractionating mechanism including a conveyor having forward and rearward co-planar table sections and a co-planar dead-plate interposed therebetween, a plurality of chain-driven flight rods for progressing a fractionated bread loaf across the rearward table section and onto the dead-plate, and means extending over the dead-plate and mounted for movement across the forward table section, said means having a plurality of shiftable pockets initially positioned over the dead-plate for separately gripping in successive order the several fractions of each loaf deposited upon the dead-plate and progressing said fractions across the forward table section one behind the other.

7. Bread loaf fractionating mechanism comprising a table, primary conveying means operatively mounted on the table for progressing the bread loaves across a portion of the length thereof, loaf subdividing means operatively mounted in the region of the primary conveying means, a secondary conveyor mounted above the table to allow the bread loaves to pass freely thereebeneath, said conveyor including a pair of spaced horizontally running endless chains provided with a plurality of spaced parallel rods extending therebetween, and a loaf-fraction engaging pocket shiftably mounted on each rod.

8. Bread loaf fractionating mechanism comprising a table, primary conveying means operatively mounted on the table for progressing the bread loaves across a portion of the length thereof, loaf subdividing means operatively mounted in the region of the primary conveying means, a secondary conveyor mounted above the table to allow the bread loaves to pass freely thereebeneath, said conveyor including a pair of spaced horizontally running endless chains provided with a plurality of spaced parallel rods extending therebetween, a loaf-fraction engaging pocket shiftably mounted on each rod, and means for shifting the loaf pockets toward the center line of their loaf-progressing travel.

9. Bread loaf fractionating mechanism comprising a table, primary conveying means operatiely mounted on the table for progressing the bread loaves across a portion of the length thereof, loaf subdividing means operatively mounted in the region of the primary conveying means, a secondary conveyor mounted above the table to allow the bread loaves to pass freely thereebeneath, said conveyor including a pair of spaced horizontally running endless chains provided with a plurality of spaced parallel rods extending therebetween, a loaf-fraction engaging pocket shiftably mounted on each of said rods, spring means for normally urging the pockets outwardly toward the ends of the rods, and means for shifting the pockets inwardly from the ends of the rods against the action of said springs during loaf progressing movement.

10. A bread loaf fractionating mechanism comprising a table, primary conveying means operatively mounted on the table for progressing the bread loaves across a portion of the length thereof, loaf subdividing means operatively mounted in the region of the primary conveying means, a secondary conveyor mounted above the table to allow the bread loaves to pass freely thereebeneath, said conveyor including a pair of spaced horizontally running endless chains provided with a plurality of spaced parallel rods extending therebetween, a loaf-fraction engaging pocket shiftably mounted on each of said rods, springs means disposed on some of the rods for normally urging the associated pockets outwardly toward the ends of the rods adjacent one side of the secondary conveyor, spring means on the other rods for normally urging the associated pockets toward the ends of the rods adjacent the other side of the secondary conveyor, and means including two converging track sections for shifting the pockets inwardly from the respective ends of the rods against the action of said springs during loaf progressing movement.

11. Bread-loaf fractionating mechanism including means for slicing the loaf, a table, means for initially progressing the sliced loaf partially across the table, means for dividing the sliced loaf into fractions during such initial progressive movement, means for then separately gripping each of the loaf fractions in successive order and individually progressing said fractions over the remainder of the table, and means for translating said last named means transversely of the table during movement therealong for shifting the loaf-fractions into alignment one behind the other.

GUSTAV C. PAPENDICK.